Patented Nov. 29, 1949

2,489,959

UNITED STATES PATENT OFFICE 2,489,959

PROCESS FOR NEUTRALIZING PEROXIDE CATALYST IN STYRENE EMULSION POLYMERIZATION

Ralph I. Dunlap, Springfield, Mass., assignor to Monsanto Chemical Company, St. Louis, Mo., a corporation of Delaware No Drawing. Application June 2, 1947,
Serial No. 751,981

6 Claims. (Cl. 260—78.5)

This invention relates to styrene polymers and copolymers. More particularly, the invention is related to water-resistant polymers and copolymers of styrene.

There are two principal methods for polymerizing styrene, i. e., mass and emulsion polymerization. The mass polymerization method is difficult to control and yields a product containing an appreciable amount of methanol-soluble material which must be removed by methods which are difficult, time consuming and expensive. On the other hand, the emulsion process is much quicker, more easily controlled and yields a product containing substantially no methanol-soluble material. However, the emulsion process does involve the use of water-soluble catalysts and emulsifying agents which render the polymers less resistant to water than desired. The residual catalyst and emulsifying agent may be removed by coagulation of the emulsion and washing of the precipitate, processes which substantially increase the cost of the emulsion process.

It is an object of this invention to provide polymers and copolymers of styrene prepared in aqueous emulsion which are resistant to water. A further object is to provide emulsions of styrene polymers and copolymers which may be direct dried without coagulation to obtain resins highly resistant to water.

These and other objects are attained by polymerizing styrene or a mixture of styrene with another substantially water-insoluble polymerizable material in aqueous emulsion in the presence of ammonium persulfate as a catalyst and then neutralizing the catalyst and its decomposition products with a water-soluble hydroxide of a metal which forms water-insoluble sulfate salts.

The following examples are given in illustration and are not intended as limitations on the scope of this invention. Where parts are mentioned, they are parts by weight.

Example I 0.6 part of the sodium salt of mahogany acids was dissolved in 700 parts of water and the solution was refluxed at atmospheric pressure for about ten minutes to remove dissolved and occluded air. A second solution containing 300 parts of styrene monomer, 0.6 part of the sodium salt of mahogany acids and 0.3 part of tertiary dodecyl mercaptan was then added gradually with constant agitation over a period of about 1 hour to the first solution while maintaining the polymerization reaction at reflux temperature at atmospheric pressure. A third solution containing 0.3 part of ammonium persulfate in 50 parts of water was added in five portions to the polymerization medium. The first portion was added simultaneously with the addition of the first of the styrene solution. Successive portions were added at 15-minute intervals during the addition of the styrene monomer.

After all ingredients had been added to the reaction vessel, polymerization was continued for about 15 minutes at reflux temperature. The resulting emulsion of polymerized styrene in water was divided into two equal parts. 0.33 part of barium hydroxide octahydrate dissolved in 100 parts of water was added slowly to one portion of the polymer emulsion. Both portions of polymer emulsion were then drum dried without coagulation. The resin derived from each portion was then milled and compression molded into a disc. The discs were placed in boiling water for about 1 hour. The disc made from the barium hydroxide treated emulsion was substantially unaffected, whereas the disc made from the unmodified emulsion was white and opaque. The disc made from the barium hydroxide treated emulsion was clear, transparent and substantially free from haze.

Example II 0.21 part of the sodium salt of sulfonated dodecyl benzene was dissolved in 175 parts of water and the solution was heated to reflux at atmospheric pressure to remove dissolved and occluded air. A mixture of 100 parts of styrene with 16 parts of fumaronitrile was added slowly with constant agitation to the boiling solution over a period of about 2 hours. A solution of 0.34 part of ammonium persulfate in 70 parts of water was also added continuously to the boiling solution over the same two-hour period. The product was an aqueous emulsion of a styrene-fumaronitrile copolymer.

The emulsion was divided into two approximately equal portions. To one portion was added slowly 0.47 part of barium hydroxide octahydrate dissolved in 100 parts of water. Both portions were dried separately at 105° C. without coagulating the emulsion. Thin sheets were compression molded from the dried resin obtained from each portion of the emulsion. The sheets were placed in boiling water for 1 hour and then examined for appearance. The sheet prepared from the barium hydroxide treated emulsion was still clear, transparent and relatively unaffected by the boiling water. The sheet prepared from the untreated emulsion was white and opaque.

*Example III*

0.4 part of the sodium salt of mahogany acids was dissolved in 175 parts of water and the solution was heated to reflux at atmospheric pressure to remove dissolved and occluded air. A mixture of 60 parts of styrene and 40 parts of α-methyl styrene was added continuously with constant agitation to the boiling solution over a period of about 4 hours. A solution of 0.3 part of ammonium persulfate in 70 parts of water was also added continuously to the boiling solution over the same 4-hour period. The product was an aqueous emulsion of a styrene-α-methyl styrene copolymer.

The emulsion was divided into two approximately equal portions. To one portion 0.33 part of barium hydroxide octahydrate dissolved in 100 parts of water was added slowly. Both portions were dried separately at about 105° C. without coagulating the emulsion. Thin sheets were compression molded from the dried resin obtained from each portion of the emulsion. The sheets were placed in boiling water for about 1 hour and then examined for appearance. The sheet prepared from the barium hydroxide treated resin was still clear and transparent and appeared to be quite unaffected by the long immersion in boiling water. The sheet prepared from the resin derived from the untreated emulsion was white and opaque after the boiling water test.

In preparing the polymers and copolymers of this invention, the amounts of the various non-polymerizable materials used including emulsifying agent, catalyst, modifying agent, etc. must be restricted within certain narrow critical ranges. Amounts outside of the critical ranges defeat the objects of this invention, i. e., amounts greater than the maximum will yield an emulsion that must be coagulated and washed to provide polymers having comparable physical characteristics and amounts less than the minimum will result either in no emulsion, poor polymerization, or poor physical characteristics of the polymers.

The emulsifying agents shown in the examples may be replaced in whole or in part by other emulsifying agents of the ionic type which operate at a pH of less than 7. Especially desirable are the salts of organic sulfonic acids such as the sodium, potassium or lithium salts of sulfonated aliphatic or aromatic hydrocarbons. The amount of emulsifying agent used must be restricted to the range of from about 0.05 to about 1.0 part per 100 parts of monomer or monomer mixture. If substantially more than 1 part of emulsifying agent is used, the emulsions produced must be coagulated and the coagulate washed free of excess emulsifier since such an excess will, if not removed from the polymer or copolymer, render the product extremely water sensitive. The coagulation process also involves the use of an added ingredient, the coagulant, which also must be washed from the polymer. If less than 0.05 part of emulsifier is used, it is practically impossible to form an emulsion.

Ammonium persulfate is the catalyst to be used in the processes of this invention and is the only catalyst which can be used to obtain the particular improved products of this invention. It may be used in quantities varying from about 0.005 to about 0.4 part per 100 parts of monomer or monomer mixture. If more than 0.4 part of ammonium persulfate is used, the polymerization reaction is too rapid for effectual control and the resultant polymer is too low in average molecular weight to be of value as a molding resin. If less than 0.005 part is used, the polymerization reaction is too slow to be of practical use and the polymers produced cannot be molded under normal conditions.

The barium hydroxide octahydrate shown in the examples should be used in quantities varying from about 1.3 to about 2 mols per mol of ammonium persulfate. It is preferred to use the octahydrate since barium hydroxide is commercially available in this form in a substantially pure state. However, anhydrous barium hydroxide, other hydrates of barium hydroxide, or hydroxides of calcium and strontium or hydrates thereof may be used to replace part or all of the barium hydroxide octahydrate. The amount of hydroxide to be used may vary from about 1.3 to about 2 mols per mol of ammonium persulfate. The hydroxide used should be dissolved in water to form a dilute solution containing no more than 0.5 part of hydroxide per 100 parts of water. The dilute solution is then added slowly and with constant agitation to the polymer or copolymer emulsion.

The tertiary dodecyl mercaptan shown in Example I was used as a modifying agent for the polymer. Other well known sulfur-containing modifying agents may be used, if desired, provided the amount of modifying agent is restricted to from about 0.025 to about 0.35 part per 100 parts of monomer or monomer mixture. The use of such modifying agents is optional and may be dispensed with entirely.

The polymerization reaction is preferably conducted at reflux temperature at atmospheric pressure but lower temperatures may be used if desired especially if one or more of the monomers is highly volatile.

It is advantageous to conduct the polymerization reaction in the absence of air by providing an atmosphere of an inert gas such as nitrogen, carbon dioxide, etc. in the reaction chamber.

Further control of the polymerization reaction may be accomplished by the agitation of the emulsion. The agitation should be slow, the maximum agitation being a rate just below the rate which would cause surface turbulence of the emulsion. Too great an agitation will coagulate the emulsion and too slow a rate will hinder the formation of an emulsion.

Emulsions made by the process of this invention need not be coagulated but may be dried directly by such conventional methods as drum drying, oven drying and spray drying and the resins thus obtained may be compounded, molded and fabricated without further purification. To obtain the direct driable emulsions, the critical proportions of emulsifying agent, catalyst modifying agent and barium or other hydroxide as set forth above must be used since larger quantities of any of these components will materially impair the quality of the resin produced and smaller quantities will not produce a satisfactory emulsion or polymer. Furthermore, the emulsions may be used without drying for coating, impregnation and other applications.

The monomeric materials which may be employed in the process of this invention are styrene and substantially water-insoluble, unsaturated monomers which are copolymerizable with styrene to produce a substantially water-insoluble copolymer. Examples of such monomeric materials are substantially water-insoluble esters, amides and other derivatives of acrylic, methacrylic and other α-substituted acrylic acids, nitriles of α, β-unsaturated acids such as acrylonitrile, methacrylonitrile, fumaronitrile, the nitriles of maleic, mesaconic, itaconic, citraconic, etc., acids, nuclear substituted styrenes such as the mono and poly chlor-or alkyl-styrenes, α-alkyl styrenes such as α-methyl or α-ethyl styrene, vinyl naphthalene, vinyl diphenyl, etc.

According to the preferred process, the monomers to be copolymerized are mixed together prior to polymerization in the proportions desired in the copolymer. The monomer mixture is then added continuously to a water solution containing the emulsifying agent and the modifying agent if any is used. The catalyst is dissolved in water separately and is added to the polymerization reaction continuously or at intervals during the addition of the monomer mixture. If desired, the emulsifying agent may be split up and part of it incorporated into the monomer mixture and the modifying agent may be either in the monomer mixture, the solution of emulsifying agent or divided between the two. Substantially the same procedure applies to the polymerization of the individual monomers.

The resins produced by the processes of this invention are clear and transparent. They are substantially unaffected by boiling water even over an extended period of time and they have excellent physical and electrical properties, age resistance, weather resistance, etc. They may be compounded with conventional additives such as fillers, dyes, resins, waxes, lubricants, etc. and may be molded and fabricated by conventional methods such as injection molding, compression molding, extrusion, etc.

This invention provides a process for preparing polymers and copolymers of styrene having superior moisture resistance and excellent physical properties by a method which is extremely rapid and efficient. It eliminates various costly and time-consuming steps necessary in previous processes and provides a superior product.

It is obvious that the processes and products of this invention may be widely varied without departing from the spirit and scope thereof as defined in the appended claims.

What is claimed is:

1. A process which comprises polymerizing 100 parts of styrene in aqueous emulsion in contact with from 0.05 to 1.0 part of an ionizable emulsifying agent operable at a pH of less than 7, and from 0.005 to 0.4 part of ammonium persulfate, then adding to the emulsion thus produced from 1.3 to 2 mols of one of the group consisting of the hydroxides of barium, strontium and calcium and the hydrates thereof per mol of ammonium persulfate.

2. A process as in claim 1 wherein the hydroxide is barium hydroxide.

3. A process which comprises polymerizing 100 parts of a mixture of styrene with a substantially water-insoluble, ethylenically unsaturated monomer polymerizable therewith in aqueous emulsion in contact with from 0.05 to 1.0 part of an ionizable emulsifying agent operable at a pH of less than 7, and from 0.005 to 0.4 part of ammonium persulfate, then adding to the emulsion thus produced from 1.3 to 2 mols of one of the group consisting of the hydroxides of barium, strontium and calcium and the hydrates thereof per mol of ammonium persulfate.

4. A process as in claim 3 wherein the substantially water-insoluble, unsaturated monomer is fumaronitrile.

5. A process as in claim 4 wherein the hydroxide is barium hydroxide.

6. A process as in claim 3 wherein the substantially water-insoluble, unsaturated monomer is α-methyl styrene.

RALPH I. DUNLAP.

REFERENCES CITED

The following references are of record in the file of this patent:

UNITED STATES PATENTS

| Number | Name | Date |
|---|---|---|
| 2,417,607 | Moury | Mar. 18, 1947 |